United States Patent [19]

Mignien et al.

[11] Patent Number: 4,632,507

[45] Date of Patent: Dec. 30, 1986

[54] CABLE-TO-REPEATER JOINING DEVICE FOR UNDERWATER OPTICAL FIBER CABLE

[75] Inventors: Georges Mignien, Leulinghen Bernes; Didier Fasquel, Calais, both of France

[73] Assignee: Les Cables de Lyon, Clichy, France

[21] Appl. No.: 649,408

[22] Filed: Sep. 11, 1984

[30] Foreign Application Priority Data

Sep. 16, 1983 [FR] France ................ 83 14764

[51] Int. Cl.⁴ .................................................. G02B 6/44
[52] U.S. Cl. ........................... 350/96.23; 350/96.20
[58] Field of Search ............... 350/96.20, 96.21, 96.22, 350/96.23; 174/705

[56] References Cited

U.S. PATENT DOCUMENTS

| | | | |
|---|---|---|---|
| 4,214,809 | 7/1980 | Reh ........................ | 350/96.20 |
| 4,388,485 | 6/1983 | Zeidler et al. ............ | 350/96.23 |
| 4,478,485 | 10/1984 | Khoe et al. .............. | 350/96.23 |
| 4,478,486 | 10/1984 | Fentress et al. .......... | 350/96.20 |
| 4,516,830 | 5/1985 | Guazzo ................... | 350/96.23 |

FOREIGN PATENT DOCUMENTS

| | | | |
|---|---|---|---|
| 0066289 | 12/1982 | European Pat. Off. ......... | 350/96.23 |
| 57-19706 | 2/1982 | Japan ......................... | 350/96.23 |
| 0078012 | 5/1982 | Japan ......................... | 350/96.23 |
| 57-96307 | 6/1982 | Japan ......................... | 350/96.23 |
| 2025650 | 1/1980 | United Kingdom ............. | 350/96.23 |
| 2075544 | 11/1981 | United Kingdom ............. | 350/96.20 |
| 2127170 | 4/1984 | United Kingdom ............. | 350/96.23 |

*Primary Examiner*—John Lee
*Assistant Examiner*—Vangelis Economou
*Attorney, Agent, or Firm*—Sughrue, Mion, Zinn, Macpeak, and Seas

[57] ABSTRACT

A device for joining an underwater optical fiber cable and a repeater comprising a fiber feed-in cable, the end of said underwater cable being secured in a jointing block by means of a tapered ferrule and hard-setting resin filler, said device comprising a slack chamber for storing surplus lengths of optical fiber, said slack chamber interior being bounded on the underwater-cable-side by a storage canister having a bulged internal wall the radius of curvature whereof is everywhere greater than or equal to the minimum acceptable radius of curvature for the optical fibers, and on the fiber-feed-cable-side by a plug having a conical internal surface. Device is mainly applicable to the joining of undersea telecommunications cables.

3 Claims, 2 Drawing Figures

CABLE-TO-REPEATER JOINING DEVICE FOR UNDERWATER OPTICAL FIBER CABLE

FIELD OF THE INVENTION

This invention concerns a device for joining an underwater optical fiber cable and an optical repeater comprised of a fiber-feeding cable consisting of a tube wherein the optical fibers freely extend, said device containing a slack chamber to accept the surplus lengths of fibers required for splicing purposes.

BACKGROUND OF THE INVENTION

The applicant has already proposed, particularly in patent application EP 0089 057, a joining device comprising a storage magazine in the form of a "slack chamber" enabling fibers to be pushed back therein after splicing. Said chamber includes a rimmed ring for receiving the optical fiber loops, but said shouldered rim still does not provide a wide enough radius of curvature to prevent fiber breakage due to overly curved looping.

It is therefore an object of the present invention to remove such risks of fiber breakage.

SUMMARY OF THE INVENTION

The invention provides a device for joining an underwater optical fiber cable and a repeater comprising a fiber feed-in cable, said underwater cable consisting of an optical core containing the optical fibers, a steel wire strength member, a copper tube swaged onto said member and an insulating jacket, the end of said cable being secured in a jointing block by means of a tapered ferrule and hard-setting resin filler, said joining device comprising a slack chamber for storing a surplus length of optical fibers, said device being further characterized in that the inside of the slack chamber, underwater-cable-side, is bounded by a storage canister having a bulged internal wall the radius of curvature whereof is everywhere greater than or equal to the minimum acceptable radius of curvature for the optical fibers, and the opposite, fiber-feeding-cable-side is bounded by a plug providing an internal conical surface.

Preferably, said bulged internal wall of the storage canister curves back towards its periphery to form an annular surface of reverse curvature in relation to the curvature of its cylindrical wall portion, and said conical internal wall of the plug terminates at its periphery in an annular surface for mating with said canister periphery, said two annular mating surfaces being substantially tangent to the direction of the fibers as said fibers enter said slack chamber.

Accommodation is preferably provided in the storage canister for a moisture absorbing product such as to communicate with the inside of the slack chamber through suitable fine channels to protect the optical fibers from the effects of humidity.

One nonlimiting example or embodiment of the joining device according to the invention will now be described with reference to the accompanying drawings.

DESCRIPTION OF THE PREFERRED EMBODIMENT

Figure 1:
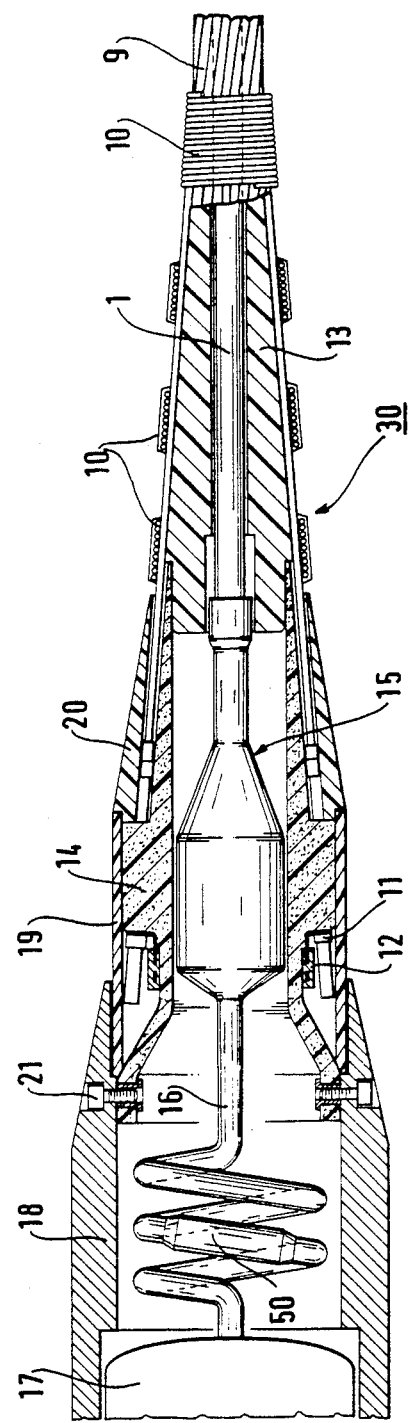
FIG. 1 is a longitudinal sectional view which illustrates a device for joining an armored underwater cable and a repeater.

Referring first to FIG. 1, an underwater cable 1 is shown, protected where it leaves a cable head 30 by an armoring 9. Said armoring is secured on a packing sleeve 13 by means of binding collars 10 and is attached to an anchor 14 by means of crimped bushes 11. The bushes are protected against oxidation by zinc anodes 12. The slack chamber 15 is slidably mounted in the anchor 14. A sheathed tube 16 leaving the slack chamber 15 comprises the feeding cable to a repeater 17. Said feeding cable sheathed tube is provided with three coil turns enabling axial extension and retraction. One of said coils is provided with a bulge 50 protecting a sliding joint, not new in itself, enabling two fiber ends to be pulled out for splicing and reinserted into said tube 16. A supporting cylinder 19 improves the stiffness of the anchor 14 to repeater housing 18 connection. The anchor 14 is fastened to said housing 18 of the repeater 17 by means of bolts 21.

Figure 2:
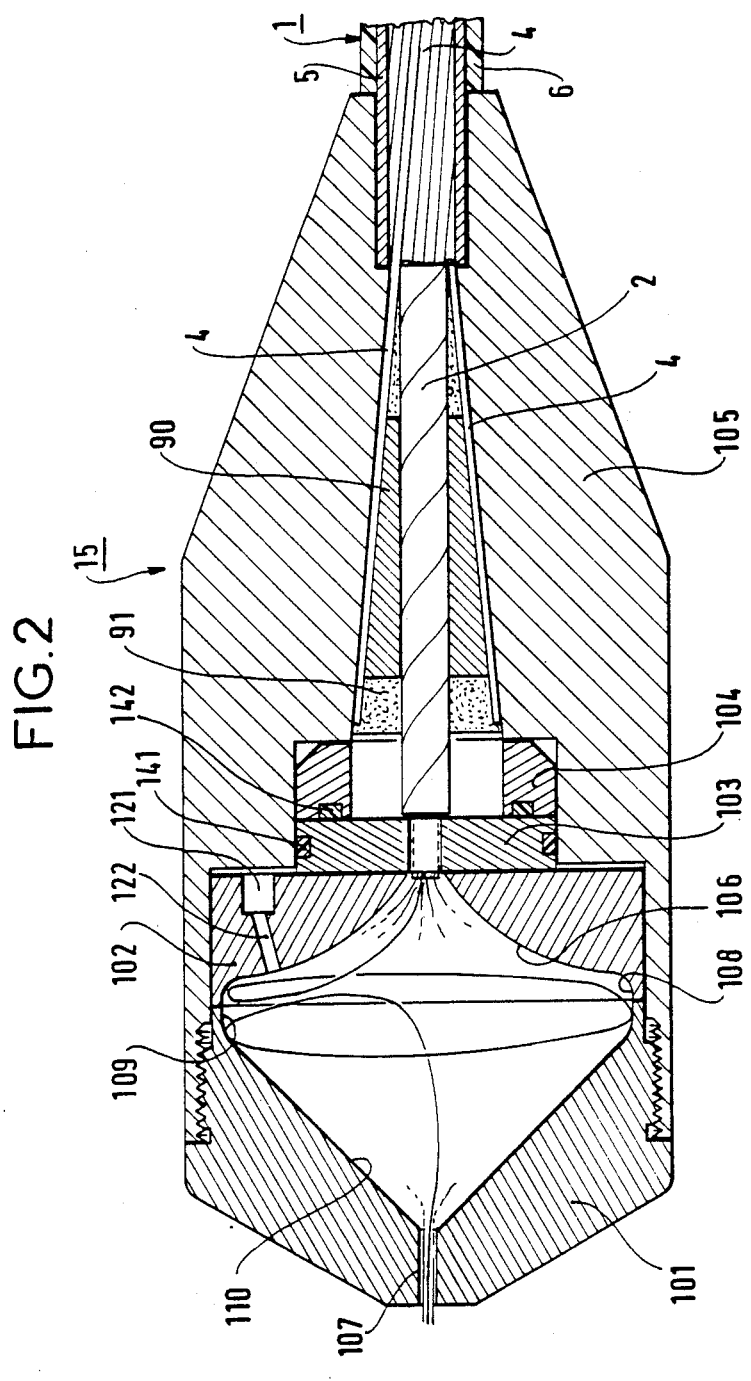
FIG. 2 is a longitudinal sectional view which shows the joining device proper, forming part of FIG. 1, in greater detail.

The detailed illustration of FIG. 2 shows the slack chamber 15, consisting of a jointing block 105 and a capping plug 101. An underwater cable 1 is shown to consist of an optical core 2 containing the optical fibers 3, of a multiple steel wire strength member 4, of a copper tube 5 swaged onto said strength member 4 and of an insulating sheath 6. This cable can also include a return conductor covered by a second insulating sheath or jacket. Said cable 1 is secured within said jointing block 105 by means of a conical ferrule 90, said ferrule serving to splay out the steel wires of strength member 4 within a tapered bore provided in said jointing block. The connection is solidified by a sealing filler 91 of hard-setting resin.

The slack chamber is provided with a fiber storage canister 102, a watertight feedthrough 103 and a ferrule collar 104. Said watertight feedthrough 103 and collar 104 are tightened by the plug 101, through its action on the storage canister 102. Tightness is provided by seals such as O-ring seals 141 and 142. Collar 104 ensures better adherence of the polyisobutylene (PIB) filler and positioning of the seal 142 outside the watertight feedthrough 103.

The canister 102 is given a bulging internal wall 106 the radius of curvature whereof is everywhere greater than the minimum acceptable radius of curvature for the fibers, and there are no sharp edges, even at the periphery. Specifically, at the center, internal wall 106 meets the fibers entering from the watertight feedthrough at a tangent. Accordingly, when the fibers are pushed back through plug centerbore 107, they apply against inside wall 106 and can never loop into a radius of curvature less than that of said wall surface 106.

Near its periphery, the surface of wall 106 meets said periphery through an annular transition surface 108 having a reversed concave curvature.

The plug 101 has a conical internal wall 110 that meets its external periphery following a cylindrical transition surface 109.

Said plug 101 and said storage canister 102 are applied face to face to one another such that their two transition surfaces 108, 109 form a cylidrical trough that is substantially tangent to the direction of the fibers at their entry into the slack chamber.

The fiber storage canister 102 contains a compartment 121 communicating with the inside of the slack chamber via fine channels 122. This compartment accommodates a desiccant to keep dry the air in the slack chamber, thus promoting better fiber life. Alternatively, said compartment could be provided in the plug body 101.

Cable-to-repeater joining is performed as follows:

Having fusion-spliced each fiber of the underwater cable together with a fiber of the fiber-feeding cable, each joined fiber is reinserted into tube 16 to remove the slack, causing the fibers to slide back into the slack chamber through the plug centerbore 107. Said fibers are forced into contact against bulged wall 106, sliding toward the periphery until they come to rest in the cylindrical trough formed by transition surfaces 108 and 109. From hereon, the fibers continue to coil up along the trough as long as surplus fiber continues to be fed through to the slack chamber.

It will be appreciated that the device just described may be utilized in other joining applications, for example applications wherein the underwater cable has no armoring, without departing from the scope of the invention as outlined in the following claims.

We claim:

1. Device for facilitating joining an underwater optical fiber cable and a repeater comprising a fiber-feed-in-cable, said underwater cable consisting of an optical core containing optical fibers, a multiple steel wire strength member, a copper tube swaged onto said strength member and an insulating sheath, one end of said underwater cable being secured in a jointing block by means of a tapered ferrule and hard-setting resin filler, said fiber-feed-in-cable comprising an optical core containing optical fibers, said device comprising a slack chamber positioned between said jointing block and said repeater for storing surplus lengths of optical fiber, said slack chamber having an underwater optical fiber cable side and a fiber-feed-in-cable side and comprising on the underwater-fiber-cable side a storage canister having an axial feed through and a convex bulged internal annular wall whose radius of curvature is equal to or larger than the minimum acceptable radius of curvature capable of preventing overly looping of the optical fibers in contact therewith to the extent of causing breakage of said optical fibers, and on the fiber-feed-in-cable side a plug facing said storage canister having a conical internal surface, the internal wall of said storage canister further including, radially outwardly of the convex bulge surface portion, a concave transition surface and wherein, the conical internal surface of said plug terminates near the periphery of said plug in a cylindrical transition surface.

2. Device as in claim 1, wherein said internal wall of said storage canister terminates at its periphery in a cylindrical transition surface, said internal wall cylindrical transition surface merging with said cylindrical transition surface of said plug such that said cylindrical transition surfaces are substantially tangent to the direction of optical fibers as said fibers enter said slack chamber.

3. Device as in claim 2, wherein a compartment is provided in the storage canister or plug body to accommodate a desiccant, said compartment communicating with the inside of the slack chamber through fine channels.

* * * * *